US012584474B2

(12) United States Patent
Many et al.

(10) Patent No.: US 12,584,474 B2
(45) **Date of Patent: *Mar. 24, 2026**

(54) 3D CELL WASHER

(71) Applicant: AGILENT TECHNOLOGIES, INC.,
Santa Clara, CA (US)

(72) Inventors: Christopher Many, Saint Albans, VT
(US); Brad Larson, South Burlington,
VT (US); Byron Smith, South Hero,
VT (US); Brian Struhammer,
Ferrisburg, VT (US)

(73) Assignee: AGILENT TECHNOLOGIES, INC.,
Santa Clara, CA (US)

( * ) Notice: Subject to any disclaimer, the term of this
patent is extended or adjusted under 35
U.S.C. 154(b) by 0 days.

This patent is subject to a terminal dis-
claimer.

(21) Appl. No.: 18/633,226

(22) Filed: Apr. 11, 2024

(65) Prior Publication Data

US 2024/0254982 A1     Aug. 1, 2024

Related U.S. Application Data

(62) Division of application No. 17/215,606, filed on Mar.
29, 2021, now Pat. No. 11,982,268, which is a
(Continued)

(51) Int. Cl.
F04B 43/12          (2006.01)
B01L 3/00           (2006.01)
(Continued)

(52) U.S. Cl.
CPC .......... F04B 43/1253 (2013.01); B01L 13/02
(2019.08); B05B 1/14 (2013.01); B08B 3/02
(2013.01); B08B 11/02 (2013.01); F04B 13/00
(2013.01); F04B 23/06 (2013.01); G01N

35/1002 (2013.01); G01N 35/1004 (2013.01);
G01N 35/1009 (2013.01); B01L 3/022
(2013.01); B01L 3/5085 (2013.01); B01L
3/50857 (2013.01); B01L 9/523 (2013.01);
B01L 2300/0829 (2013.01); B05B 9/0423
(2013.01); B08B 2203/0229 (2013.01);
(Continued)

(58) Field of Classification Search
CPC combination set(s) only.
See application file for complete search history.

(56) References Cited

U.S. PATENT DOCUMENTS

| 3,723,030 A | 3/1973 | Gelfand |
| 4,952,518 A | 8/1990 | Johnson et al. |
| | (Continued) | |

OTHER PUBLICATIONS

MicroFlo Select Manual "https://www.biotek.com/products/literature/
MicroFlo%20Select%200ps%20Manual%207171000%20Rev%20C.
pdf" (Year: 2010).

(Continued)

*Primary Examiner* — Binh Q Tran

(57) ABSTRACT

An autoclaving microplate washing system for cells and
non-adhering three-dimensional (3D) cell cultures includes
one or more pumps for controlling the dispensing of wash-
ing fluid and the evacuation of fluid from microwells to
gently wash the cells. A method of controlling the autoclav-
ing microplate washing system includes controlling the one
or more pumps for dispensing and evacuation.

20 Claims, 17 Drawing Sheets

Related U.S. Application Data division of application No. 15/911,865, filed on Mar. 5, 2018, now Pat. No. 10,961,997.

(60) Provisional application No. 62/466,760, filed on Mar. 3, 2017.

(51) Int. Cl.

| | |
|---|---|
| *B01L 3/02* | (2006.01) |
| *B01L 9/00* | (2006.01) |
| *B05B 1/14* | (2006.01) |
| *B05B 9/04* | (2006.01) |
| *B08B 3/02* | (2006.01) |
| *B08B 11/02* | (2006.01) |
| *F04B 13/00* | (2006.01) |
| *F04B 23/06* | (2006.01) |
| *F04B 27/04* | (2006.01) |
| *G01N 15/01* | (2024.01) |
| *G01N 35/04* | (2006.01) |
| *G01N 35/10* | (2006.01) |

(52) U.S. Cl.
CPC ....... *F04B 27/0418* (2013.01); *F04B 43/1215* (2013.01); *F04B 43/1261* (2013.01); *G01N 15/01* (2024.01); *G01N 2015/019* (2024.01); *G01N 2035/0437* (2013.01); *G01N 2035/1023* (2013.01)

(56) References Cited

U.S. PATENT DOCUMENTS

| | | | | |
|---|---|---|---|---|
| 5,186,760 | A | 2/1993 | Rubenzer | |
| 5,951,783 | A | 9/1999 | Kontorovich et al. | |
| 6,393,338 | B1 | 5/2002 | Kemnitz | |
| 8,591,832 | B2 | 11/2013 | Nelson | |
| 10,961,997 | B2 * | 3/2021 | Many | G01N 35/1004 |
| 11,414,639 | B2 * | 8/2022 | Griffin | C12M 25/02 |
| 11,982,268 | B2 * | 5/2024 | Many | G01N 35/1009 |
| 2003/0062067 | A1 * | 4/2003 | Meyer | B08B 9/00 |
| | | | | 134/25.4 |
| 2006/0002824 | A1 | 1/2006 | Chang et al. | |
| 2006/0078961 | A1 * | 4/2006 | Chiu | B01L 3/502715 |
| | | | | 435/288.5 |
| 2008/0190458 | A1 | 8/2008 | Garcia Gros et al. | |
| 2009/0208377 | A1 | 8/2009 | Fetvedt | |
| 2013/0115607 | A1 * | 5/2013 | Nielsen | C12Q 1/68 |
| | | | | 435/6.12 |
| 2018/0163713 | A1 * | 6/2018 | Morachis | F04B 43/12 |
| 2021/0370300 | A1 * | 12/2021 | Köser | B01L 3/502761 |

OTHER PUBLICATIONS

Microplate Washer Dispenser EL-406™ sold by BioTek Instruments, Inc. (Operator's Manual) (Year: 2009).

* cited by examiner

WASH

1401

107

3D CELL WASHER

CROSS-REFERENCE TO RELATED APPLICATIONS

The present application is a Divisional Application of U.S. application Ser. No. 17/215,606, filed on Mar. 29, 2021, which is a Divisional Application of U.S. application Ser. No. 15/911,865, filed on Mar. 5, 2018, now U.S. Pat. No. 10,961,997, issued on Mar. 30, 2021, which claims the benefit of U.S. Provisional Application No. 62/466,760, filed on Mar. 3, 2017, in the U.S. patent and Trademark Office, the contents of which are incorporated herein by reference in their entireties.

BACKGROUND

1. Field

Embodiments of the present application relate to microplate washing systems, and more particularly to microplate washing systems for cells and non-adhering three-dimensional (3D) cell cultures.

2. Description of Related Art

Conventionally, microplates have been employed for conducting various biochemistry assays. For example, microplates have been used to conduct enzyme-linked immunosorbent assay (ELISA) on, for example, 96 samples at a time.

FIG. 1 illustrates a typical 96-well microplate 1. The microplate 1 includes 96 circular-shaped microwells 2.

Recently, microplates including up to, for example, 384 microwells have been developed with the intention to increase the number of samples per microplate of the same overall size.

FIG. 2 illustrates a typical 384-well microplate. The microplate 3 includes 384 wells 4. As illustrated, the spacing between the microwells 2 of the standard 96-well microplate is larger than the spacing between the microwells 4 of the 384-well microplate 3. For example, the spacing between the microwells 4 of the 384-well microplate 3 may be 4.5 mm, or half of the spacing between, for example, the 9 mm microwells 2 of the 96-well microplate 1.

Pipettes are generally employed to fill or sample the microwells of the microplates. The pipettes may be configured or arranged in rows, to thereby enable simultaneous access to a number of microwells. For example, if eight pipettes are arranged in a row, with the centers of the pipettes being 9 mm apart, the pipettes can access eight wells of either the 96-well microplate 1 or the 384-well microplate 3. Due to the different spacings between the microwells 2 of the 96-well microplate and the microwells 4 of the 384-well microplate 3, however, the pipettes may simultaneously access consecutive or adjacent microwells of the 96-well microplate 1, but not the microwells 4 of the 384-well microplate 3.

FIG. 3 illustrates a portion of a conventional ELISA process.

As illustrated in FIG. 3, a microwell 31 may be coated with a coating 32, for example with specific antigens. A fluid sample 34, for example from a human patient, may be provided in the microwell 31. An antibody 33 present in the fluid sample 34 may bind to the antigen coating 32. Thereby, a combination of the antibody 33 and antigen 32 may be strongly bound to an interior wall of the microwell 31.

Not all antibodies, however, may bind to the antigen coating 32, as some residual unbound antibodies 35 will remain in the fluid sample 34. Such residual antibodies 35 should be removed from the well.

In general, microplates may be manually washed. For example, microwells may be filled with a solvent, such as water, by hand under using a conventional tap, bottle, or multichannel pipette. Then, the microplate may be inverted to dispose any remaining fluid, for example over a sink, and dried.

To automate microwell cleaning, a microplate washer has been developed. Due to the strong nature of the binding of the antigen and antibody complex to the wall of the microwell in the case of ELISA, the microplate washer should vigorously wash the microwell. An example of a conventional microplate washer is the EL405, manufactured by Biotek Instruments and is discussed in U.S. U.S. Pat. No. 5,951,783, incorporated herein by reference, which describes an example of a conventional ELISA washer, for example that is capable of washing both 96-well microplates and 384-well microplates. To wash and dry the microplates, the microplate washer may include two separately movable manifolds, a first manifold for dispensing fluid into microwells and a second manifold for attaining aspiration of fluid from the microwells.

As a convenient format, the use of microplates and microwells has spread to almost all biological experimentation, including cell research. FIG. 4 illustrates a general cell research configuration. As illustrated in FIG. 4, cells 42 may be seeded on a bottom of the microplate well 41. Over time, the cells 42 may be grown in cell culture incubators under controlled temperature (e.g., 37° C.) and atmospheric conditions (e.g., 5% $CO_2$). During incubation, the cells 42 may spread while adhering to the bottom of the microwell 41.

As discussed above, a traditional ELISA microplate washer may be configured to vigorously wash microplates. However, such configuration may be undesirable to clean microplates for use in cell research, as the dispensing rate of fluid into microwell may be too strong, thereby resulting in stripping of the seeded cells from the bottom of the microwells. Accordingly, a vacuum may be used in microplate washers for aspiration of well contents, which might still evacuate the seeded cells from the wells.

To mitigate such problems, traditional microplate washers have been better adapted to washing microplates in which cells are disposed. For example, washing fluid may be dispensed into sides of the well, and not directly on the bottom of the microwells, via angled pipes. Alternatively or in addition, the dispensing rate of washing fluid may be reduced, as compared to ELISA microplate washers.

FIG. 5 illustrates a conventional microplate cell washing technique. As illustrated therein, a microwell 51 includes cells 52 disposed at the bottom of the microwell 52. A tilted dispense pipe arrangement is provided in which fluid is dispensed from dispense pipe 55 towards the side of the microwell 51. As a result, the likelihood of dislodging the cells 52 from bottom of the microwell 51 and into the cleaning solution may be reduced. An aspiration pipe 57 may also be included, and the depth of insertion of the aspiration pipe 57 to vacuum the microwell 51 may be reduced, as compared to an ELISA washer. An example of a commercial cell washer is the EL405 Cell Washer manufactured by BioTek Instruments, which is suitable for cell washing operations in which angled dispense manifolds are provided and the fluid dispensing rate may be controlled.

Recently, researchers have recognized that adherent cells in microwells, which appear as a two-dimensional (2D) layer, while useful, have limitations in accurately representing living tissues. This is because, cells in living tissues grow in three dimensions, not generally in two dimensions as confined by the bottom of a microwell. Thus, 3D cell cultures have appeared as a next step in cell research.

A 3D cell culture is an artificially created environment in which biological cells are permitted to grow or interact with their surroundings in three dimensions. This more closely mimics actual growth of cells in vivo. Accordingly, it is desirable to most closely replicate in vivo conditions for modern cell research.

Three-dimensional cell cultures are called spheroids. Pharmaceutical research on cells in spheroids aims to duplicate in vivo cell behavior. For example, for purposes of drug toxicity screening, testing gene expression of in vitro cells grown in 3D is more useful than testing in 2D, since the gene expression in the 3D spheroids will more closely resemble gene expression in vivo. Also, 3D cell cultures have greater stability and longer life spans than cells in 2D culture, and hence 3D cell cultures may be more suitable for long term studies and for demonstrating long term effects of the drugs.

Accordingly, to advance the research and to leverage microplate automation, spheroids would ideally be placed into wells of microplates.

FIG. 6 schematically illustrates cells in a microwell. As illustrated in FIG. 6, a 3D cluster of individual cells 62 forming a spheroid 63 is located on the bottom of a microwell 61.

However, existing microplate instrumentation may be incapable of utilizing cell spheroids. For example, a standard microplate washer developed for the ELISA process and modified to accommodate washing adherent to the microwell bottoms may be an inadequate device for washing microwells containing spheroids. For example, this is because the spheroids do not adhere to the microwell. Instead, spheroids tend to congregate, due to gravity, on the lowermost concavity of the bottom of the microwell 61. Moreover, the spheroids are easily disturbed during the dispensing and evacuation cycles provided by existing microplate washers. As a result, the spheroids may be washed away after a single washing cycle, for example one aspiration followed by one dispensing, in a conventional cell washer.

FIG. 7 is a perspective view of a dispensing manifold. As illustrated therein, an eight channel strip washer manifold 71 includes eight dispensing pipes 72. The eight channel strip washer manifold 71 may deliver fluid into the microwells of the microplate. Although eight channels corresponding to the dispensing pipes 72 are depicted, additional channels may be present.

A line 73 supplies washing fluid to the common channel 74 of the dispensing manifold 71. Control of the fluid delivery rate is necessary for spheroid washing. As the fluid rate is reduced, the flow from the manifold 71 becomes erratic. For example, some pipes 72 may still deliver fluid while other pipes 72 may experience a low flow rate or no flow rate. Thus, while the total volume delivered by manifold as a whole may be repeatable, the individual pipe to pipe delivery rate may be unpredictable.

One possible solution to provide more control over fluid flow may be to omit the manifold, and instead deliver fluid into the microwells via a positive displacement fluid delivery system. For example, an eight channel pipette manufactured by Eppendorf is one such device. Thereby, a user may obtain the fluid from a reservoir and dispense the fluid into a single column of a microplate while controlling the delivery rate of the fluid.

Another commonly used dispensing technique in modern laboratory relies on a multichannel peristaltic pump. Use of this device is typical in the laboratory for dispensing small amounts of reagents. U.S. Pat. No. 4,995,432 describes one such dosage equipment system, and is incorporated here by reference. Therein, three flexible tubing pipes are stretched over four rollers. The fluid delivery between the channels is made equal by variably stretching the tubing. All the fluid delivering tubes are arranged in a single cassette that is removable from the instrument. Thereby, the instrument is a three-channel peristaltic pump dispenser with very small variation of fluid flow rate between all channels.

Conventionally, the number of lines of the peristaltic pump dispenser may be increased to correspond to the number of microwells in a column of a microplate, to simultaneously fill the microwells. The cassette is typically made to be autoclaveable. One example of such an instrument is BioTek Instrument MicroFlo FX.

The performance of such dosage equipment system is evaluated by the ability to deliver equal volumes per channel into the microwells of the microplate. This is done by maintaining a high velocity of fluid as dispensed from the dispensing tip, just prior to entering the microwell. This assures clean fluid breaking and a high reproducibility of the dosage of the dispenser. But, even when the dispense rate is reduced, the fluid will still be dispensed in a relatively equally manner from each channel. This is in contrast to the manifold-based system of FIG. 7.

Known washing systems employ manifolds for evacuating fluid. For example, eight-channel or twelve-channel manifolds are employed for strip-based washers, whereas 96-channel and 384-channel manifolds are employed for plate washers. Suction may be provided by vacuum pump or suction stroke of a positive displacement pump, such as syringe pump. Alternatively, some washers rely on suction developed by diaphragm based fluid pumps. Thus, the aspiration rate via the manifold cannot be sufficiently reduced because some pipes will stop performing aspiration. Fluid clearing the aspiration pipes unequally enters into a common channel and air starts to enter manifold via some pipes, while fluid from some microwells never enters manifold. At the end of aspiration, fluid retraces back into microwells from some of the pipes.

To provide reliable but slow aspiration rate, the flow in each microwell channel should thus be independently controlled. This may be implemented via a direct positive displacement system in each channel, for example via eight-channel pipette, manufactured by Eppendorf, using aspirate stroke. The picked up from microwell fluid then needs to be disposed in the waste reservoir. While this method can be used for manual washing of a few microplates, such method does not provide cost effective automation. Moreover, while automated pipette systems exist, using eight-channel or twelve-channel pipettes, or even 96-channel or 384-channel pipettes, size and cost prohibit their use as plate washers.

Last, a plate filling system could also be modified to become a washer. A U.S. Pat. No. 8,591,832 describes an eight-channel peristaltic pump used for fluid dispensing. Therein, the wash system uses an eight-channel peristaltic pump that delivers fluid via lines to the microwells of the microplate. The system has an optional vacuum manifold that can be combined with individual dispense channels in the same head, and so pipes are formed in the head. Some pipes connect via peristaltic tubing action to dispense reservoir, while other pipes are interconnected via manifold and then via single aspirate line to the waste reservoir maintained under vacuum by vacuum pump.

However, aspiration performed under vacuum and via manifold is unsuitable as spheroid washer. Further, the arrangement of dispense pipes and aspirate pipes placed into a single head for each well has other limitations, as described in U.S. Pat. No. 5,951,783. A pair of aspirate and dispense pipes, when located in a single head can be placed close enough to enter large wells of 96-well plates, but the single head arrangement will become impractical for small wells of the 384-well plate. To dispense fluid onto the side of the well, as is common to 2D cell washers and for even gentler requirements of spheroid washing, the dispense pipes should be tilted. Having a tilted dispense pipe and an aspirate pipes both enter the well is impractical even for 96-well plate size microwells and impossible for smaller 384-plate size microwells.

Consequently, a novel approach to the microplate washers, to create a very gentle washing process suitable for washing 3D spheroids in microplates, is desirable.

SUMMARY

Embodiments of the present application provide a cell washer for gently washing spheroids and/or having a fluid path that is easily sterilized.

Embodiments of the present application provide a single wash cycle that includes aspiration process and dispensing process for cell maintenance to remove exhausted media in which cells grow and replacing the exhausted media with the fresh media.

To maintain a clear fluid path free from contaminants preferred for cell media refreshing process, embodiments of the present application autoclave the complete fluid system for both the dispensing fluid path and to autoclave aspirate pipes that come in contact with fluid in the well.

Embodiments of the present application provide for flexible configuration according to microwell arrangement, such as to account for both 96-well and 384-well microplates.

Aspects of the present disclosure may address at least the above-mentioned problems and/or disadvantages and to provide at least the advantages described below. However, aspects of the present application are not required to address the above-mentioned problems and/or disadvantages, and may provide other advantages not described.

According to an aspect of an example embodiment, there is provided a microplate cell washing system including a microplate carrier configured to support a microplate; a microplate comprising a plurality of microplate wells, the microplate disposed on the microplate carrier; a dispensing peristaltic pump; a dispensing peristaltic pump cassette comprising a plurality of dispense lines terminating in dispense pipes, the plurality of dispense lines connected to the dispensing peristaltic pump; an aspirating peristaltic pump; an aspirating pump cassette comprising a plurality of aspiration lines terminating in aspiration pipes, the plurality of aspiration lines connected to the aspirating peristaltic pump; a processor configured to execute a cleaning control program, which when executed causes the microplate cell washing system to independently control: positions of the microplate wells relative to positions of the plurality of dispense pipes, and the positions of the microplate wells relative to positions of the plurality of aspiration pipes.

According to an aspect of an example embodiment, there is provided a method of controlling the microplate cell washing system.

According to an aspect of an example embodiment, there is provided a method of controlling the microplate cell washing system.

According to an aspect of an example embodiment, there is provided a non-transitory computer-readable medium storing computer instructions that are configured to, when executed by at least one processor, cause the at least one processor to perform the method.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
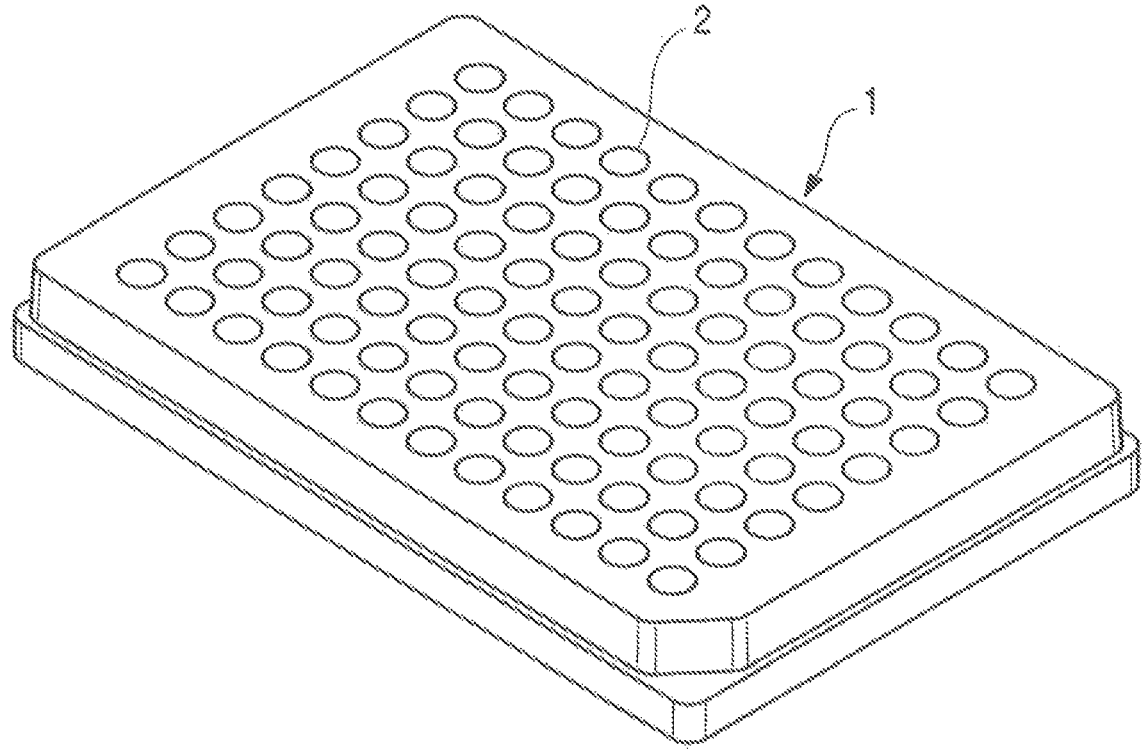
FIG. 1 is a perspective view of a 96-well microplate.
Figure 2:
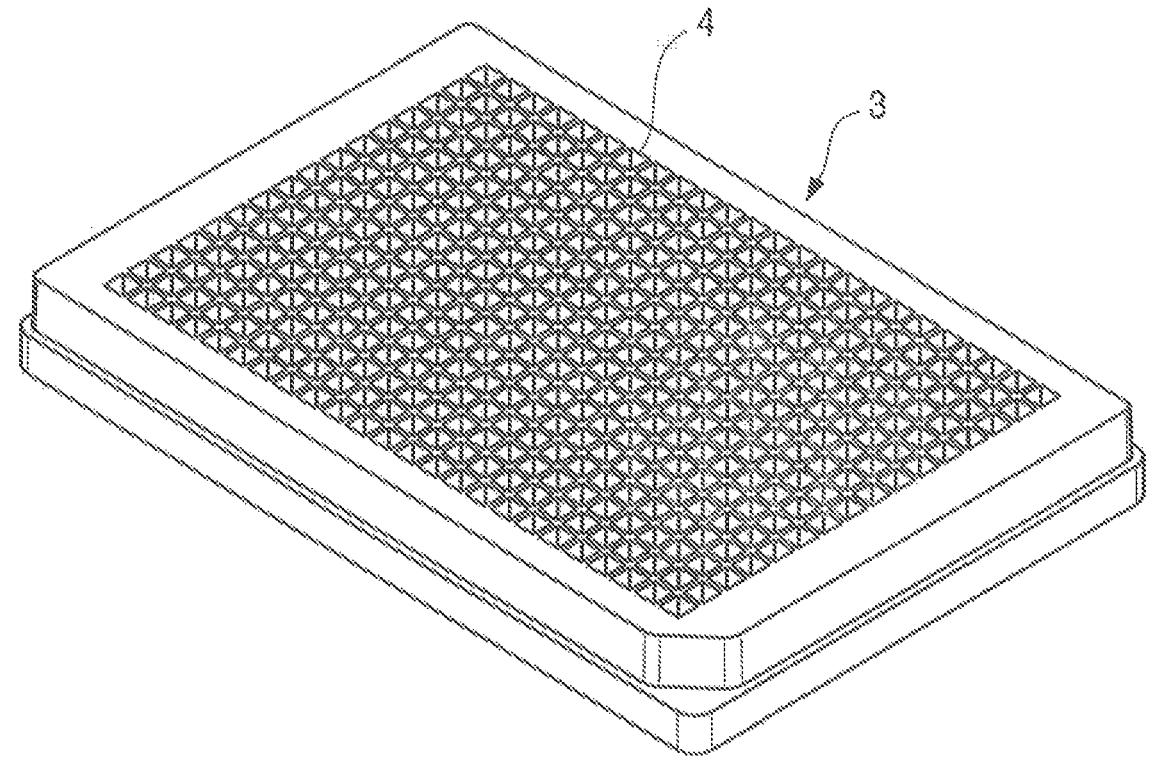
FIG. 2 is a perspective view of a 384-well microplate.
Figure 3:
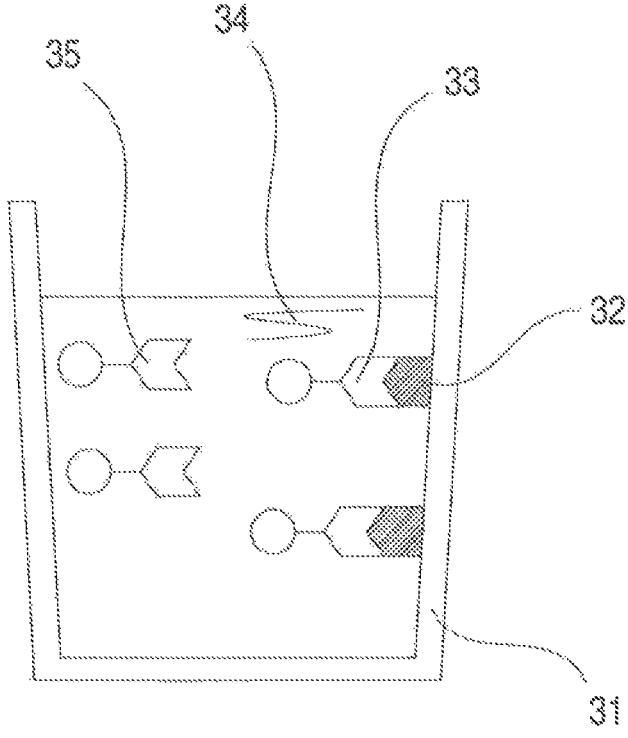
FIG. 3 is a diagram of an enzyme-linked immunosorbent assay (ELISA) process in a microwell.
Figure 4:
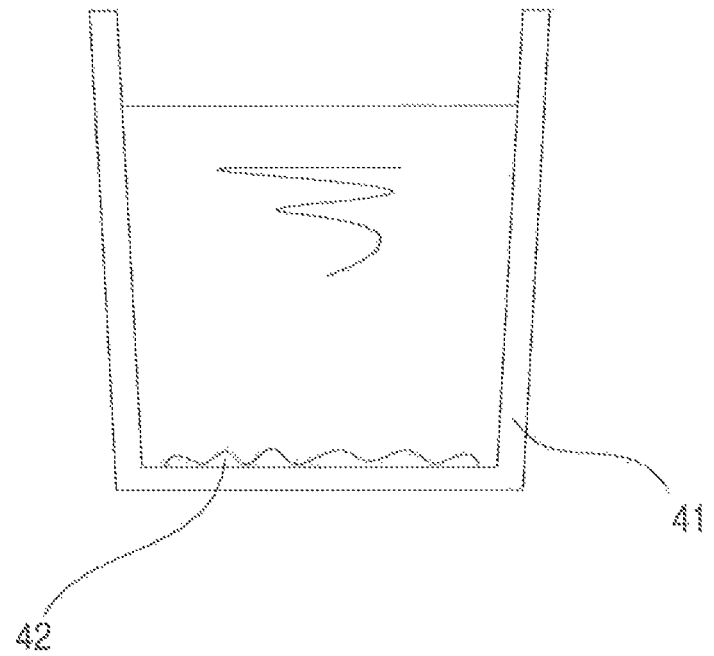
FIG. 4 is a diagram of a cell research configuration in a microwell.
Figure 5:
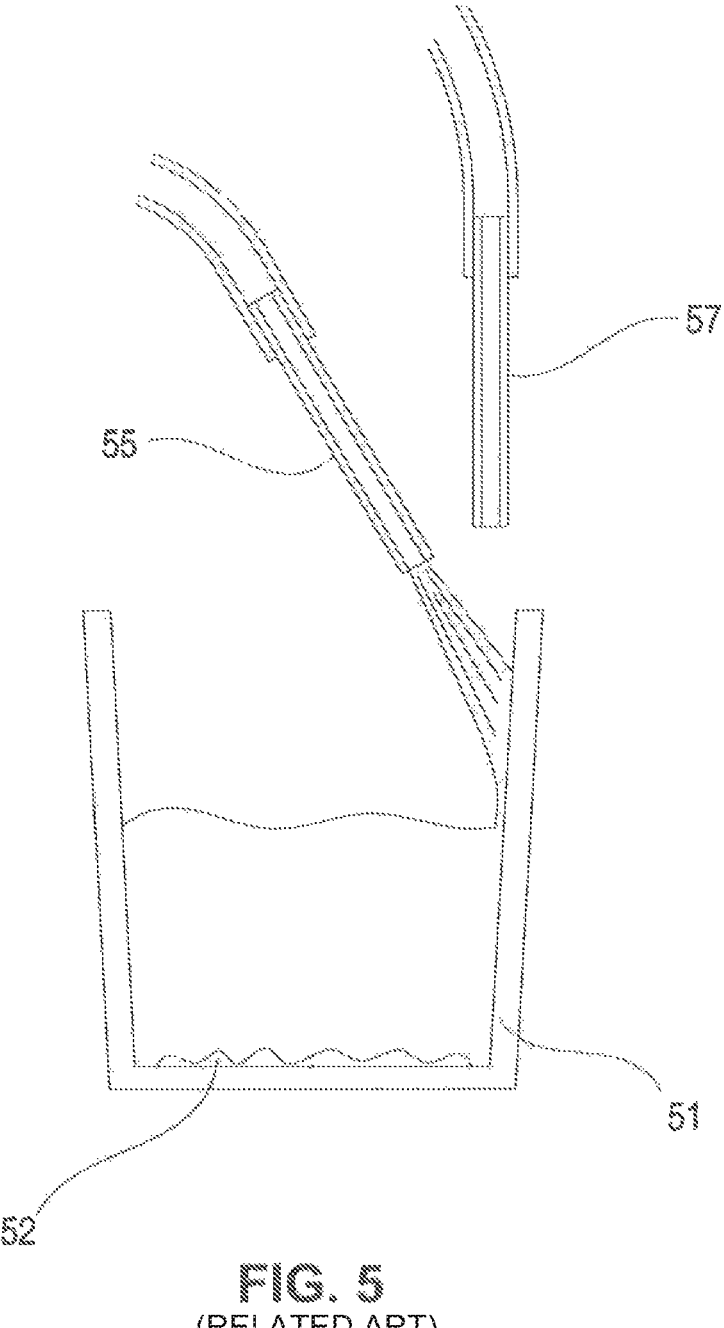
FIG. 5 is a diagram of a microplate washing technique.
Figure 6:
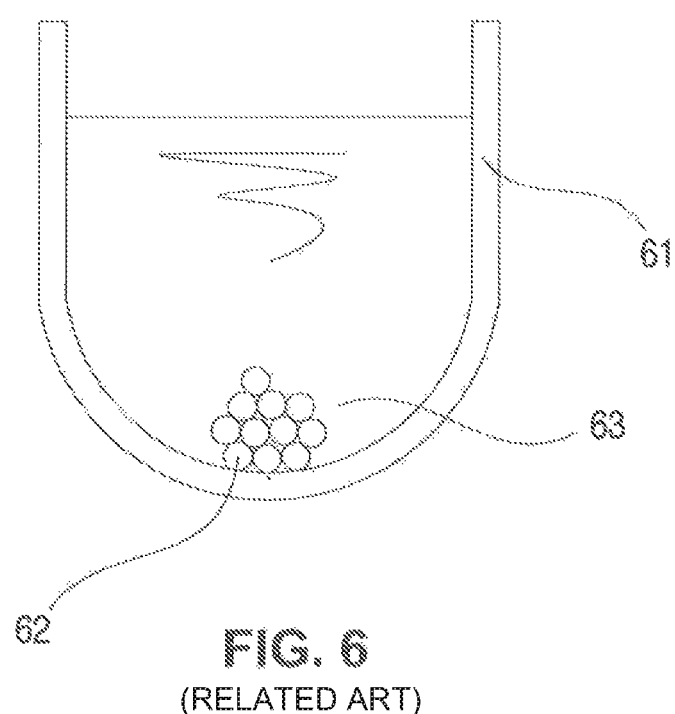
FIG. 6 is a perspective view of spheroids in a microwell.
Figure 7:
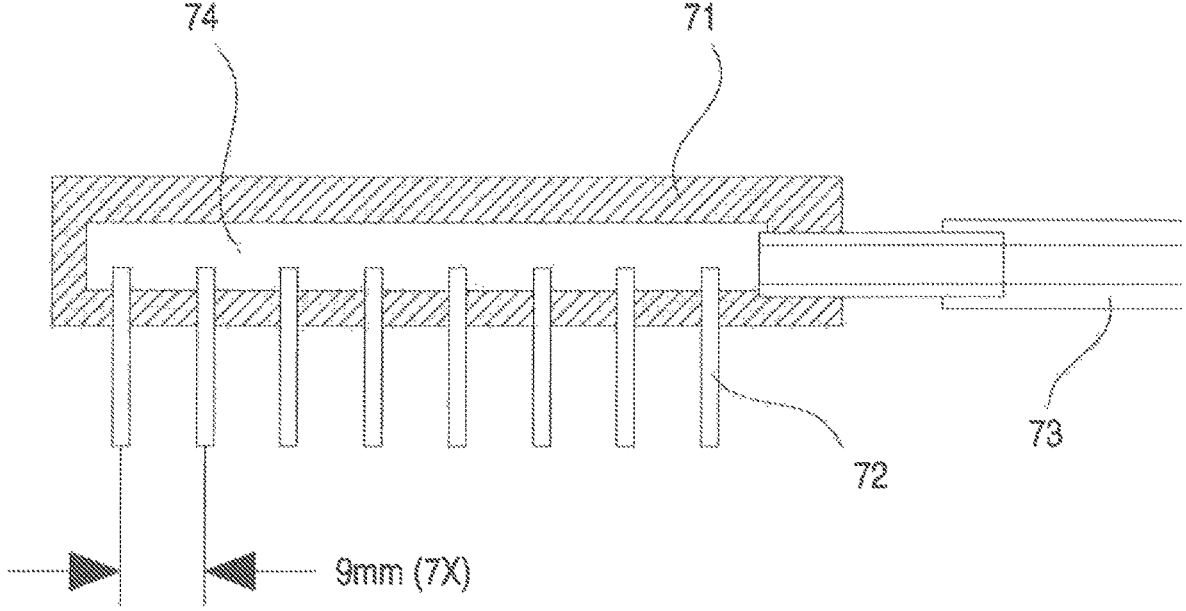
FIG. 7 is a perspective view of a dispensing manifold, according to an aspect of an embodiment.

Reference will now be made in detail to embodiments, examples of which are illustrated in the accompanying drawings, wherein like reference numerals refer to like elements throughout. In this regard, the embodiments may have different forms and should not be construed as being limited to the descriptions set forth herein. Accordingly, the embodiments are merely described below, by referring to the Figures, to explain aspects of the present application.

As used herein, the term "and/or" includes any and all combinations of one or more of the associated listed items. Expressions such as "at least one of" and "at least one selected from" when preceding a list of elements, modify the entire list of elements and do not modify the individual elements of the list. For example, "at least one selected from a, b, and c," should be understood as including: only a, only b, only c, both a and b, both a and c, both b and c, or all of a, b, and c.

The terms used in the present disclosure are for the purpose of describing embodiments only and are not intended to be limiting. Singular forms are intended to include the plural forms as well, unless the context clearly indicates otherwise. Throughout the present application, when a part is connected to another part, the part is not only directly connected to another part but also electrically connected to another part with another device intervening. If it is assumed that a certain part includes a certain component, the term "including," "comprising," and "having" mean that a corresponding component may further include other components unless a specific meaning opposed to the corresponding component is written.

The use of "a," "an," and "the" and other demonstratives similar thereto may correspond to both a singular form and a plural form. Unless the order of operations of a method according to the disclosure is explicitly mentioned or described otherwise, the disclosure is not limited by the order the operations are mentioned.

The phrase used in various parts of the present specification, such as "an embodiment" does not necessarily indicate the same embodiment.

The matters defined in the description, such as detailed construction and elements, are provided to assist in a comprehensive understanding of the disclosure. Thus, it is apparent that the embodiments may be carried out without those specifically defined matters. Also, well-known functions or constructions are not described in detail to avoid unnecessarily obscuring the aspects herein.

Unless otherwise defined, when an element includes another element, the element may further include other elements.

Various elements and regions illustrated in the drawings are schematically drawn. Therefore, the technical spirit of the present disclosure is not limited by relative sizes or arrangements shown in the Figures.

Successful washing of spheroids and/or performing successful media exchanges for the microwells having spheroids necessitates one or more of: a gentle dispensing rate of washing fluid into the microwell, to avoid disturbing the spheroids, a gentle aspiration rate of the contents of the wells around the spheroids, the ability to control the location of a tip of a dispensing pipe relative to the microwell to facilitate a gentle dispensing cycle, the ability to control the location of aspiration pipes relative to the microwell to facilitate a gentle aspiration cycle, and the ability to autoclave the dispensing fluid path and any parts that come in contact with the contents in the microwell.

Figure 8:
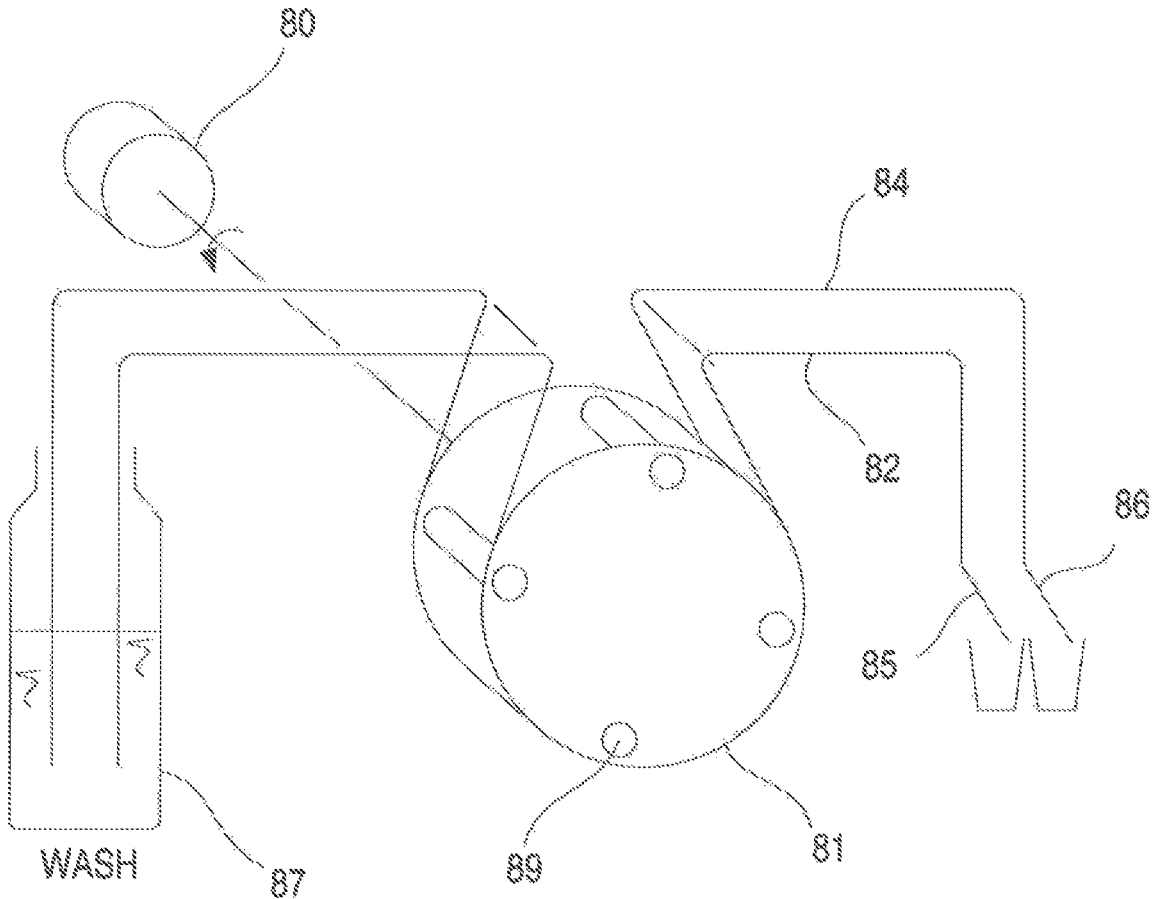
FIG. 8 illustrates a dispensing peristaltic pump and tubing arrangement, according to an embodiment.

FIG. 8 illustrates a dispensing peristaltic pump and tubing arrangement, according to an embodiment.

As illustrated in FIG. 8, the peristaltic pump 81 includes rollers 89 driven by a motor 80. For example, the peristaltic pump 81 may include four rollers 89. Fluid lines 82, 84 are connected to the peristaltic pump. For ease of description, only two fluid lines 82, 84 are illustrated, though more lines may be provided, such as eight fluid lines. Each fluid line 82, 84 is connected to a washing fluid reservoir 87 and respective dispense tips 85, 86. Only one fluid reservoir 87 is illustrated, though additional fluid reservoirs may be provided connection to one or more of the fluid lines.

No manifold is present in the fluid path. Accordingly, quality and purity of the fluid path is ensured due to lack of obstructions or crevices from the reservoir to the dispense tip. The continuous nature of the fluid lines 82, 84 also enables easy removal from the instrument and autoclaving. Further, absence of the manifold from the fluid path enables flow control to be performed within the fluid lines 82, 84 via speed control of the motor 80.

Alternatively, the tubing set of fluid lines 82, 84 can be arranged into a replaceable cassette that is configured to be connected to and disconnected from the instrument. In this fashion, the complete cassette can be autoclaved.

By control of the motor 80 to control the flow rate of fluid, the peristaltic pump 81 with fluid lines 82, 84 connecting dispense tips 85, 86 to the fluid reservoir 87 is configured to provide gentle fluid delivery of a wash solution suitable for spheroid washing. Thus, both appropriate fluid delivery and autoclaveability of the fluid path may be obtained.

Figure 9:
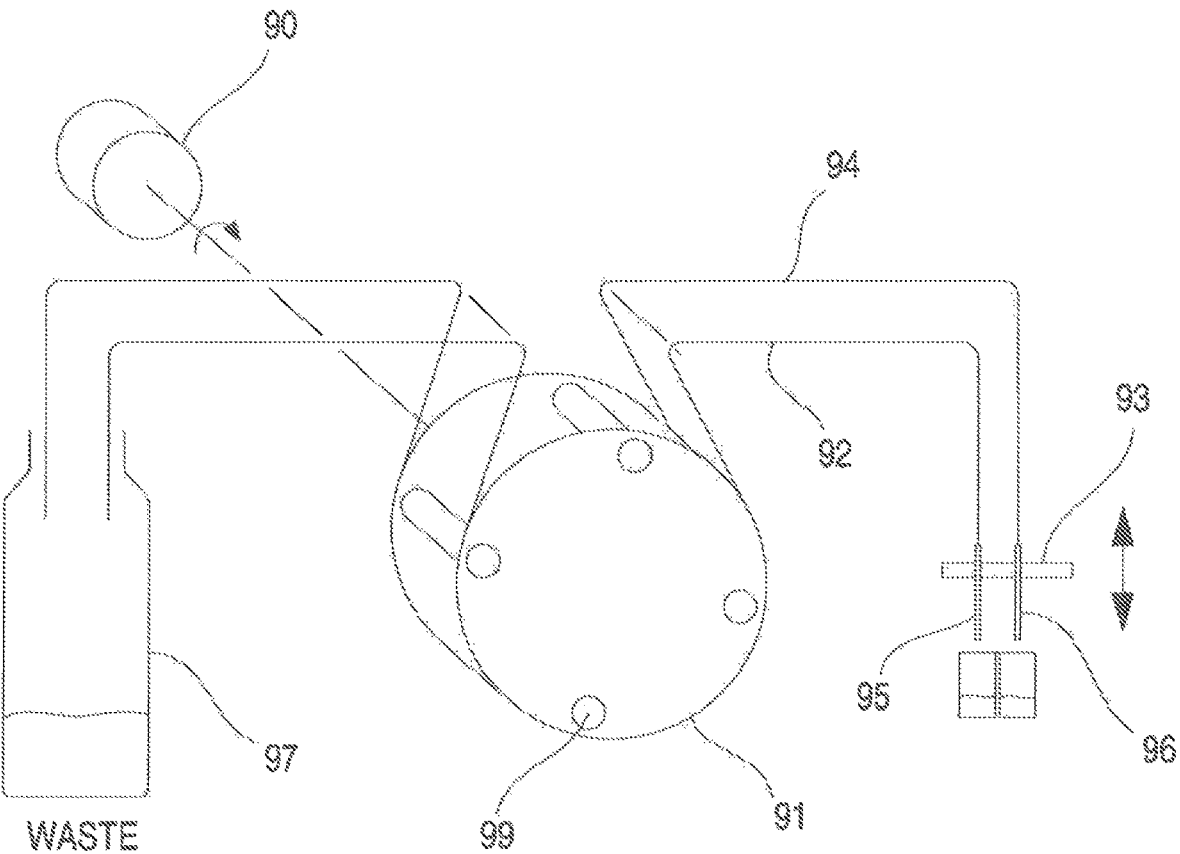
FIG. 9 illustrates an aspirating peristaltic pump and tubing arrangement, according to an embodiment.

FIG. 9 illustrates an aspirating peristaltic pump and tubing arrangement, according to an embodiment.

As illustrated in FIG. 9, an (eight-channel) peristaltic pump is adopted for fluid aspiration. A head 91 with rollers 99 is driven by motor 90. Two fluid lines 92, 94 connect waste fluid reservoir 97 to the aspiration tips 95, 96. Aspiration tips 95, 96 may be vertically disposed within a holder 93. Although only fluid lines 92, 94 and aspiration tips 95, 96 are illustrated, additional fluid lines and aspiration tips may be provided.

Because no manifold exists in the fluid path, the fluid flow rate can be finely controlled, for example to be very slow, for spheroids. In addition to providing very gentle aspiration rates, the complete aspiration fluid path may be arranged into a removable, replaceable cassette, which may be removed from the instrument and autoclaved.

The peristaltic pump 91 may be configured for gentle fluid aspiration via control of the motor 99 suitable for spheroid washing and including gentle aspiration rates and autoclaveability of the parts that come in contact with wells, such as tips 95, 96, in addition to autoclaving the complete fluid path.

According to an embodiment, separate dispense pump and aspiration pumps are provided. Thereby, motions of the dispense pump and aspiration pump may be independently controlled.

Figure 10:
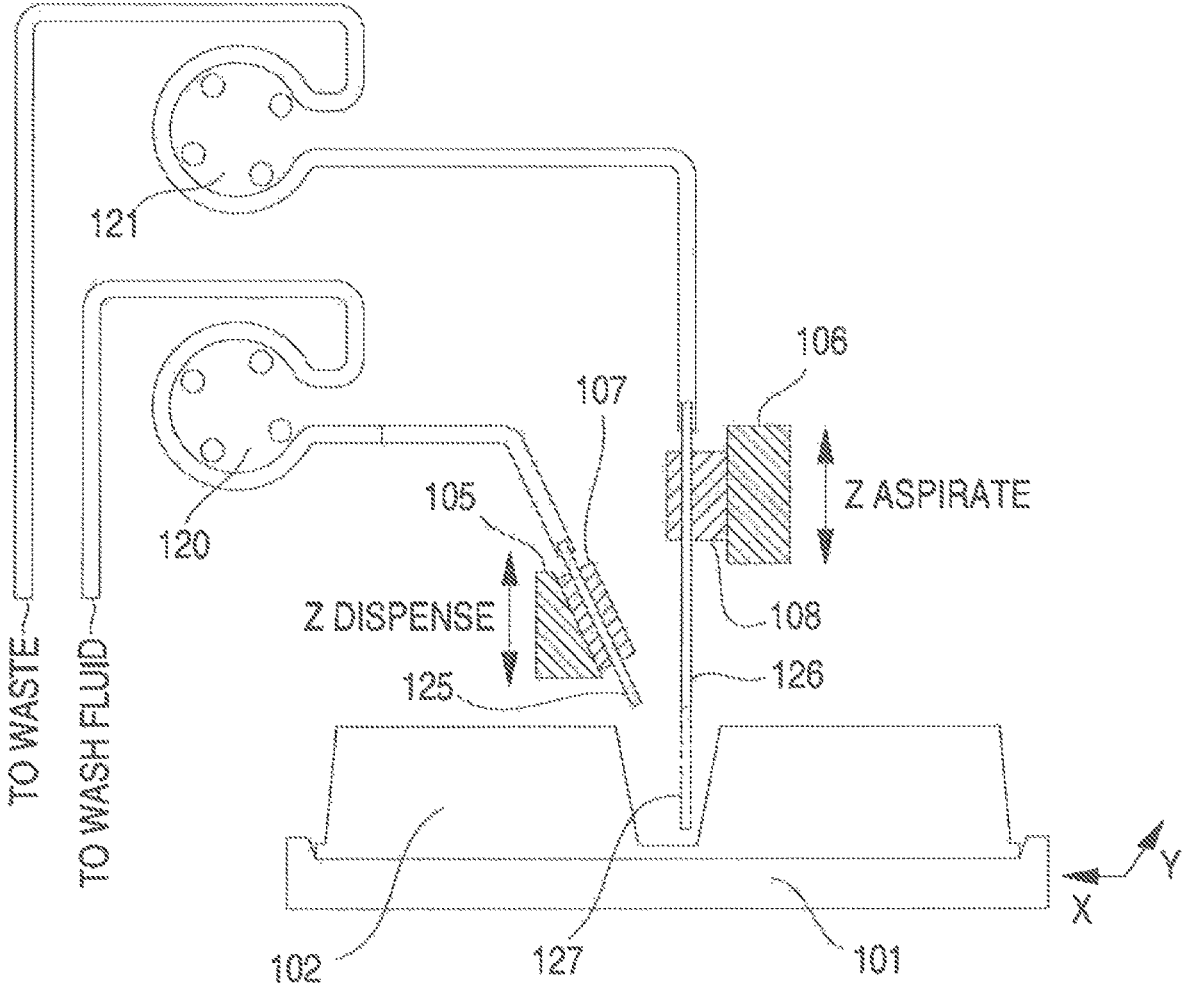
FIG. 10 illustrates an arrangement of two peristaltic pumps, according to an embodiment.

FIG. 10 illustrates an arrangement of two peristaltic pumps, according to an embodiment. As illustrated in FIG. 10, microplate 102 is disposed on carrier 101. The carrier 101 is configured to be movable in the XY plane via one or more of linear ways, timing belts or lead screws, stepper or DC motors, as well as other components. A dispense peristaltic pump 120 and aspiration pump 121 are provided to respectively wash and aspirate the microwell. Though only one fluid line is shown for the dispense head 121 and one fluid line is shown for aspiration head 120, the number of lines for each pump head may be greater, for example eight lines per pump head.

The dispense pipes 125 are placed into common block 107 that is an integrated component of a dispense cassette. Block 107 is removably attached to bracket 105. A similar arrangement is made for aspiration pipes 126 placed into block 108, which is a component of the aspiration cassette.

Block 108 is removably attached to bracket 106. Brackets 105, 106 may be configured to move substantially vertically in the Z-direction under independent control by mechanical means, such as lead screws or timing belt, for example, along with DC or stepping motors or other motion means.

The dispense block 107 and aspiration block 108 may be configured to simultaneously move up and down. Alternatively, aspiration block 108 may be configured to translate, as shown in dashed lines 127, to evacuate the microwell while the dispense block 107 is otherwise positioned away from interference, for example to hover over the rim of the well.

Dispense pipe 125 may be configured to be tilted to direct the flow of fluid onto the wall of the well, so as to avoid disturbance of spheroids in the microwell.

The microplate 102 can be controlled to be positioned in the XY plane for dispensing and for aspirating, as required by the assay needs via carrier 101. The XY motion of the carrier 101 enables optimizing well location relative to the dispense pipe 125 and aspirate pipe 126 to respectively ensure sure fluid is provided away from a center of the microwell (and settled spheroids), and to ensure that evacuation of the well is done as far from center of the microwell (and settled spheroids) as possible.

Having ability to move microplate in the XY plane further enables the device of FIG. 10 to dispense into both 96-well and 384-well plates. For example, eight dispense pipes separated by 9 mm can serve both 96-well microplates (8 microwells spaced 9 mm per column) and 384-well microplates (16 wells spaced 4.5 mm per column). Similarly, the eight aspiration pipes can aspirate fluid from both 96-well and 384-well micro plates.

Dispense pipes and aspiration pipes can be moved substantially vertically and independently from each other. Further, XY microplate motion provides an ability to fine-tune a pipe's tip location relative to the well to facilitate both a gentle dispense cycle and gentle aspiration cycle, regardless of microplate size and arrangement.

The configuration of FIG. 10 enables to autoclave the complete fluid path when working with cells. The tubing for both dispense and aspiration may be configured to be arranged in removable cassettes. The material in the cassette can be autoclaveable, for example with materials including silicon tubing, PEI Ultem, aluminum, polypropylene, and stainless steel.

Figure 11:
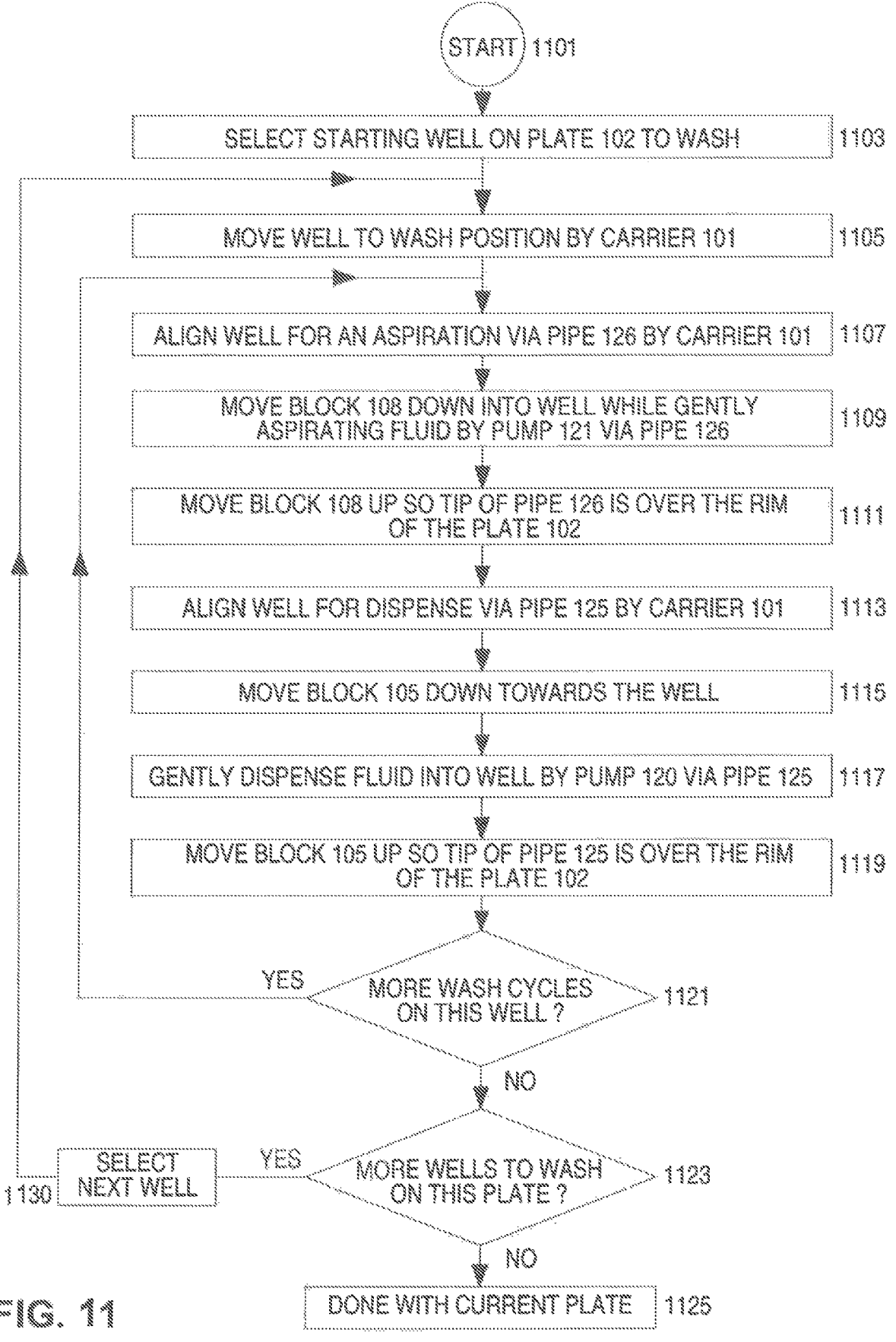
FIG. 11 is a flow chart of a method of cleaning a microplate, according to an embodiment.

FIG. 11 is a flow chart of a method of cleaning a microplate, according to an embodiment.

With reference to FIG. 10, one microwell washing is shown in FIG. 10 and described in FIG. 11. However, the method of FIG. 11 is applicable to all microwells in a microplate. For example, the peristaltic pumps 120, 121 may each include eight fluid lines, so an eight-microwell column of a 96-well microplate (1/12 of the microplate) can be simultaneously washed.

In step 1103, a starting well of the microplate is specified. The staring well may be a staring location of the microplate, such as a particular well in a row and/or column of the microplate.

In step 1105, the carrier 101 is controlled to move the specified well to the washing position.

In step 1107, a desired XY alignment of the well relative to aspiration pipe 126 is controlled by carrier 101.

In step 1109, block 108 is moved down while peristaltic pump 121 slowly rotates and gently pulls fluid from the well as the pipes descends in 1109.

In step 1111, block 108 is then raised so the tip of the aspiration pipe 126 is just above the rim of the microplate 102. In this position an XY adjustment of well is possible without interference from aspiration pipes.

In step 1113, the microwell may be aligned to an XY position for optimum dispense. The fluid may be aimed at the wall of the well.

In step 1115, block 105 with dispense pipe is moved down towards the well. Dispense pipe may enter the well or stay just above the rim.

In step 1117, the peristaltic pump 120 gently dispenses fluid into the microwell via pipe 125.

In step 1119, block 105 is moved up after dispense. If more wash cycles are required in step 1121: YES, the process may be repeated. If more wells are needed to be washed in step 1123: YES, the next well is selected in step 1130 and the process repeats from step 1105. Otherwise, the method may complete in step 1125.

In this manner the complete or partial plate can be gently washed as many times as required.

The control method illustrated in FIG. 11 may be implemented through execution of a processing unit (e.g., CPU) controlling elements of the cleaning system by executing one or more control programs. The programs may be stored in a memory (i.e., RAM, ROM, flash, etc.), or other computer-readable medium (i.e., CD-ROM, disk, etc.). The program may be executed locally by the system, or by a control apparatus, such as a computer that transmits commands to be executed by the system.

Figure 12:
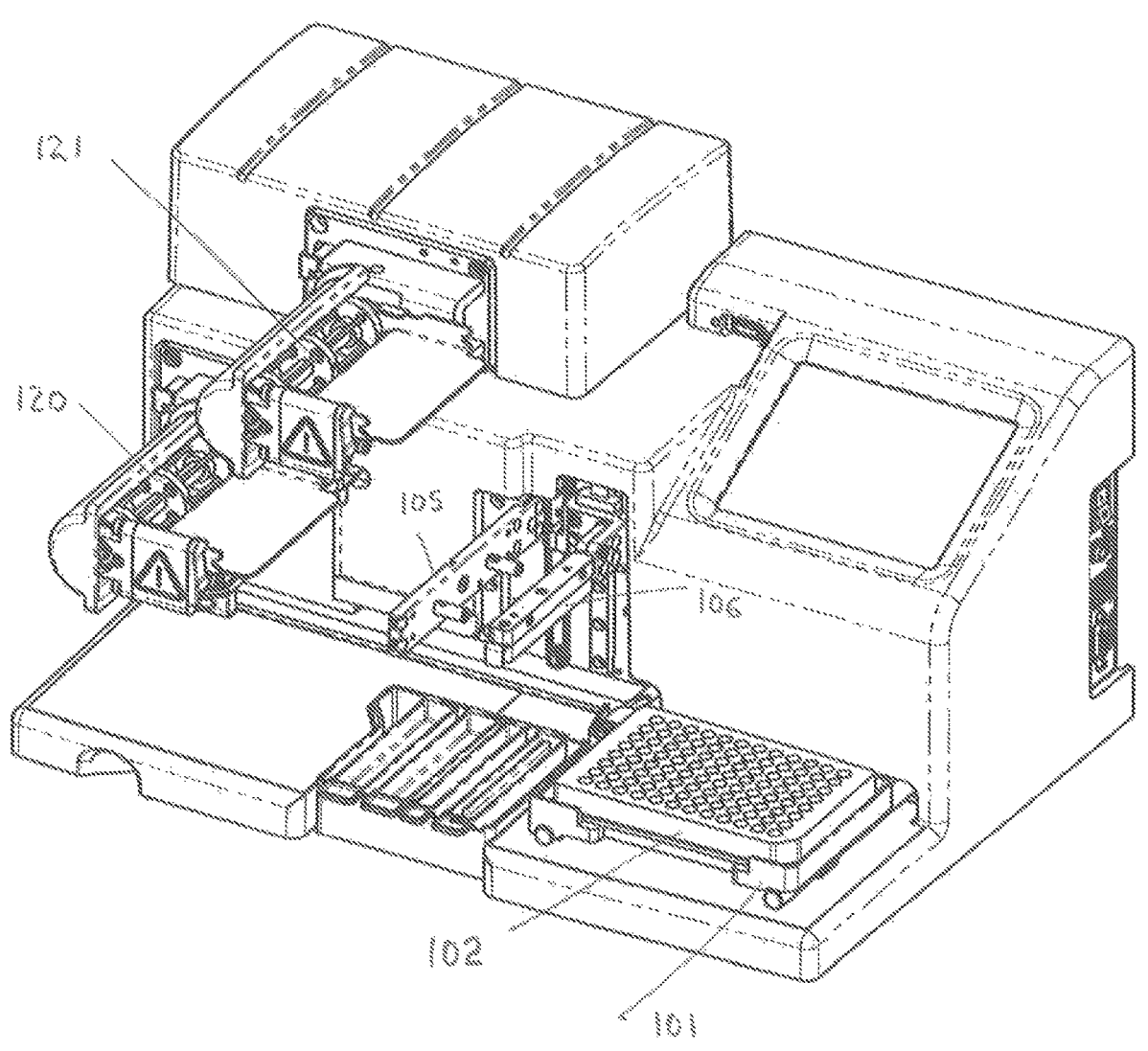
FIG. 12 illustrates a multifunctional dispenser according to an embodiment.

FIG. 12 illustrates a multifunctional dispenser according to an embodiment.

As illustrated in FIG. 12, the multifunction dispenser may include a carrier 101, a microplate 102, vertically movable brackets 105, 106, a dispense peristaltic pump 120, and an aspiration pump 121.

An example of the multifunctional dispenser is the MultiFlo FX manufactured by Biotek Instruments, which includes microplate washing and is adapted for washing 3D spheroids.

Figure 13:
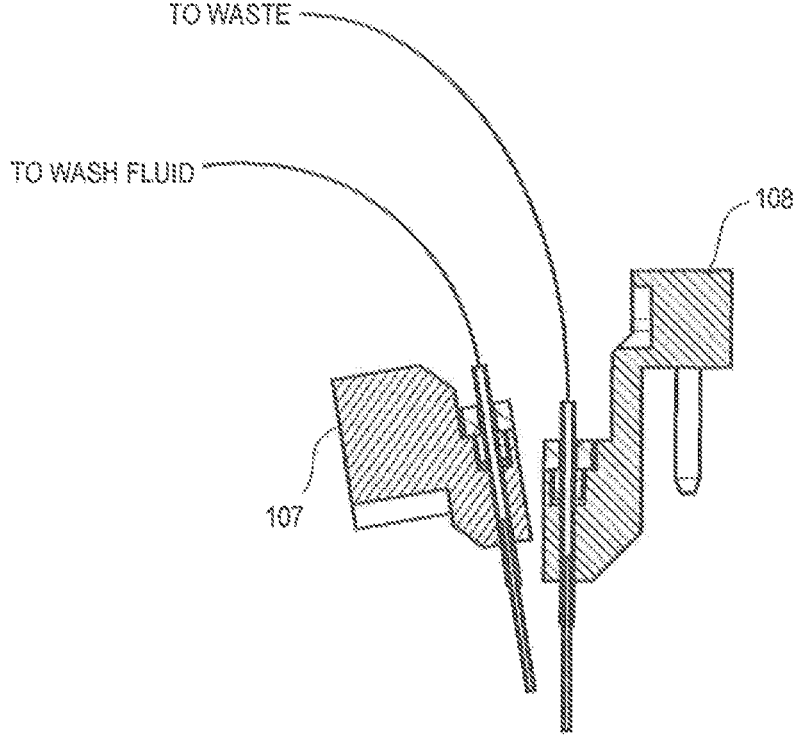
FIG. 13 illustrates a dispense block and an aspiration block, according to an embodiment.

FIG. 13 illustrates a dispense block and an aspiration block, according to an embodiment.

As illustrated in FIG. 13, the dispense block 107 includes at least one pipe through which wash fluid is provided for washing microwells of a microplate.

Similarly, the aspiration block 108 includes at least one pipe through which the microwells of the microplate may be evacuated to a waste repository.

Figure 14:
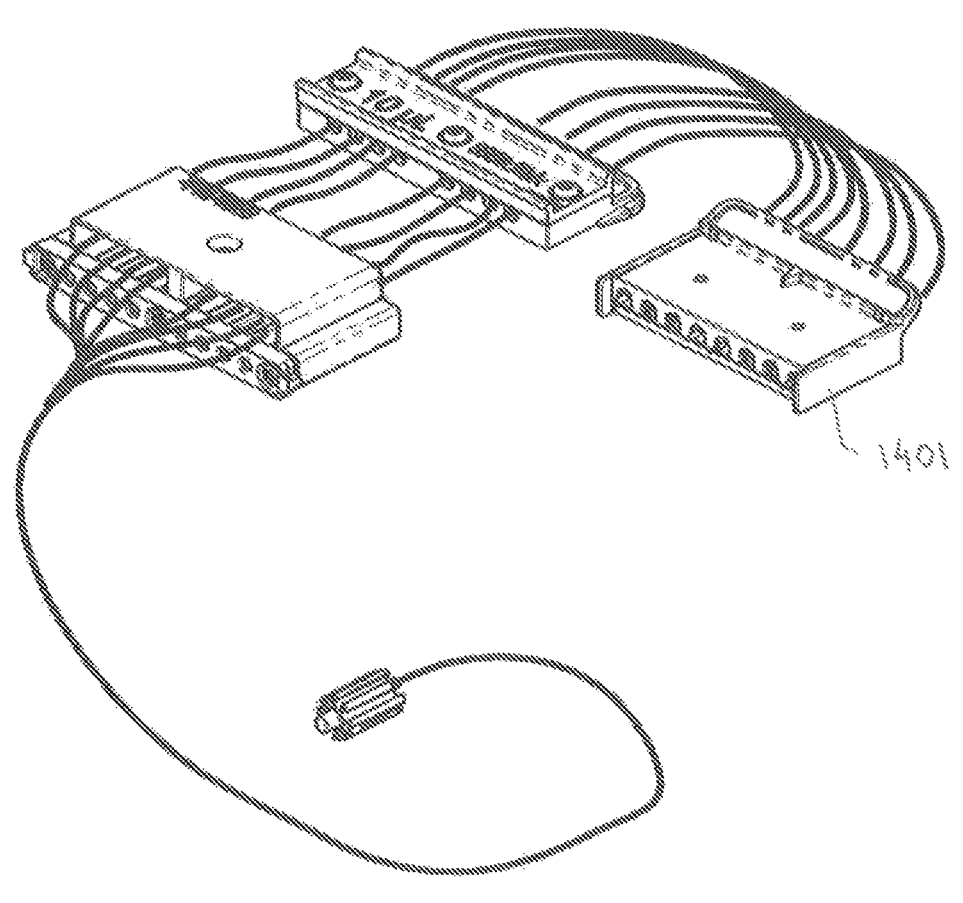
FIG. 14 illustrates a conventional dispense cassette.

FIG. 14 illustrates a conventional dispense cassette, according to an embodiment.

As illustrated in FIG. 14, a dispensing peristaltic pump dispense cassette is provided for connection to a pump. The block 1401 holds eight dispense tips being 9 mm spaced apart from their centers. Each tip is a terminal for each of the eight dispense lines.

Figure 15:
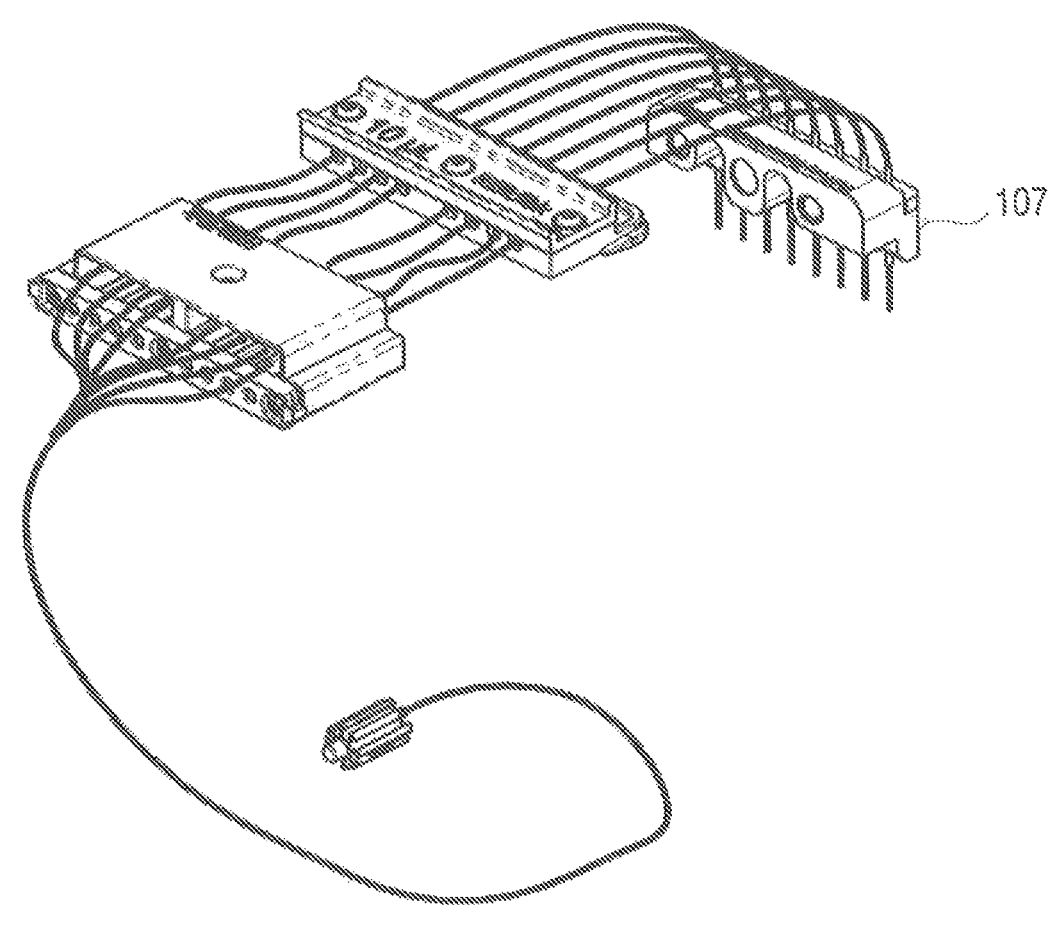
FIG. 15 illustrates a dispense cassette, according to an embodiment.

FIG. 15 illustrates a dispense cassette, according to an embodiment.

As illustrated in FIG. 15, the block 1401 and eight dispense tips are replaced with the dispense block 107. In this regard, the dispense cassette is serves as a dispensing peristaltic pump cassette of a 3D spheroid washer.

Figure 16:
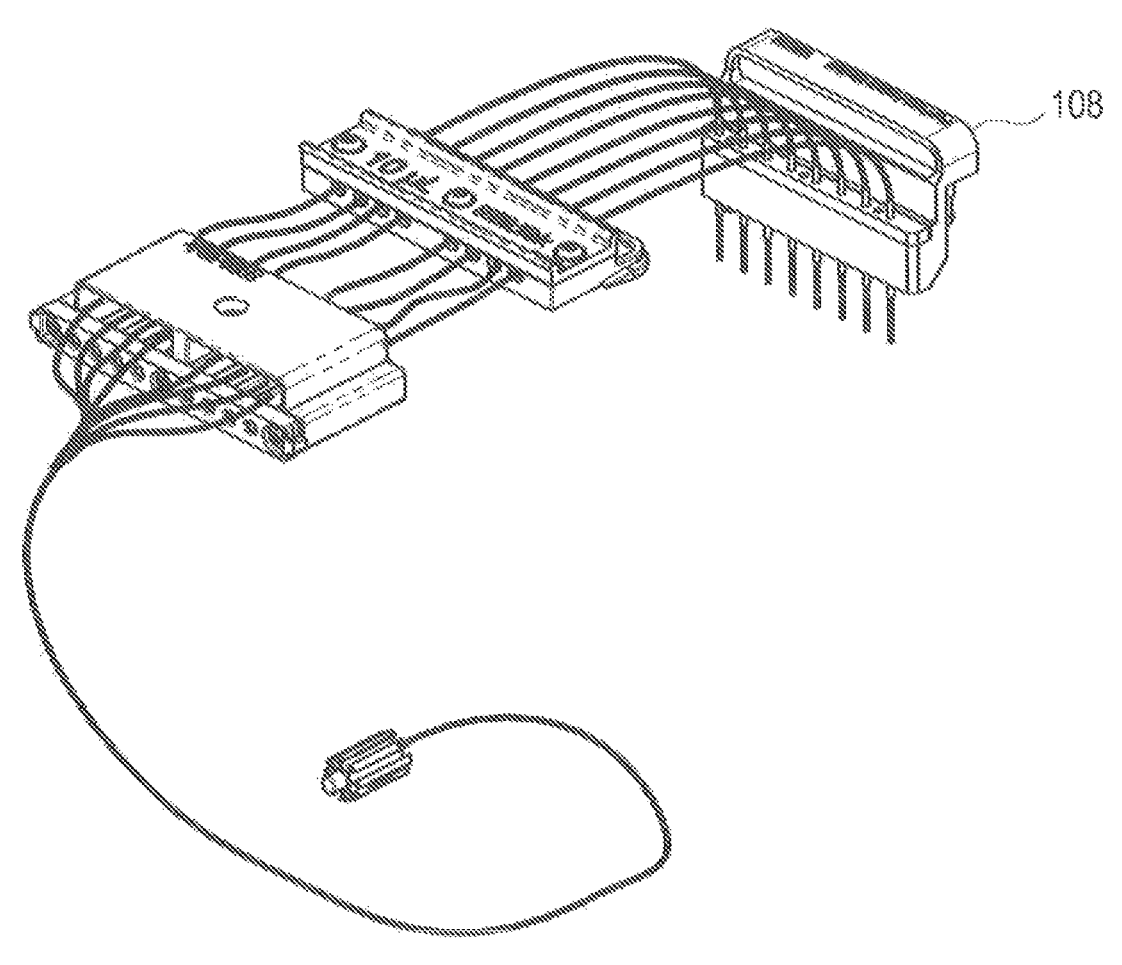
FIG. 16 illustrates an aspiration cassette, according to an embodiment.

FIG. 16 illustrates an aspiration cassette, according to an embodiment.

As illustrated in FIG. 16, the block 1401 and eight dispense tips are replaced with aspiration block 108. In this regard, resulting cassette of serves as an aspirating peristaltic pump cassette of a 3D spheroid washer.

Detailed views of dispense block 107 and aspiration block 108 have been discussed with respect to FIG. 13.

Figure 17:
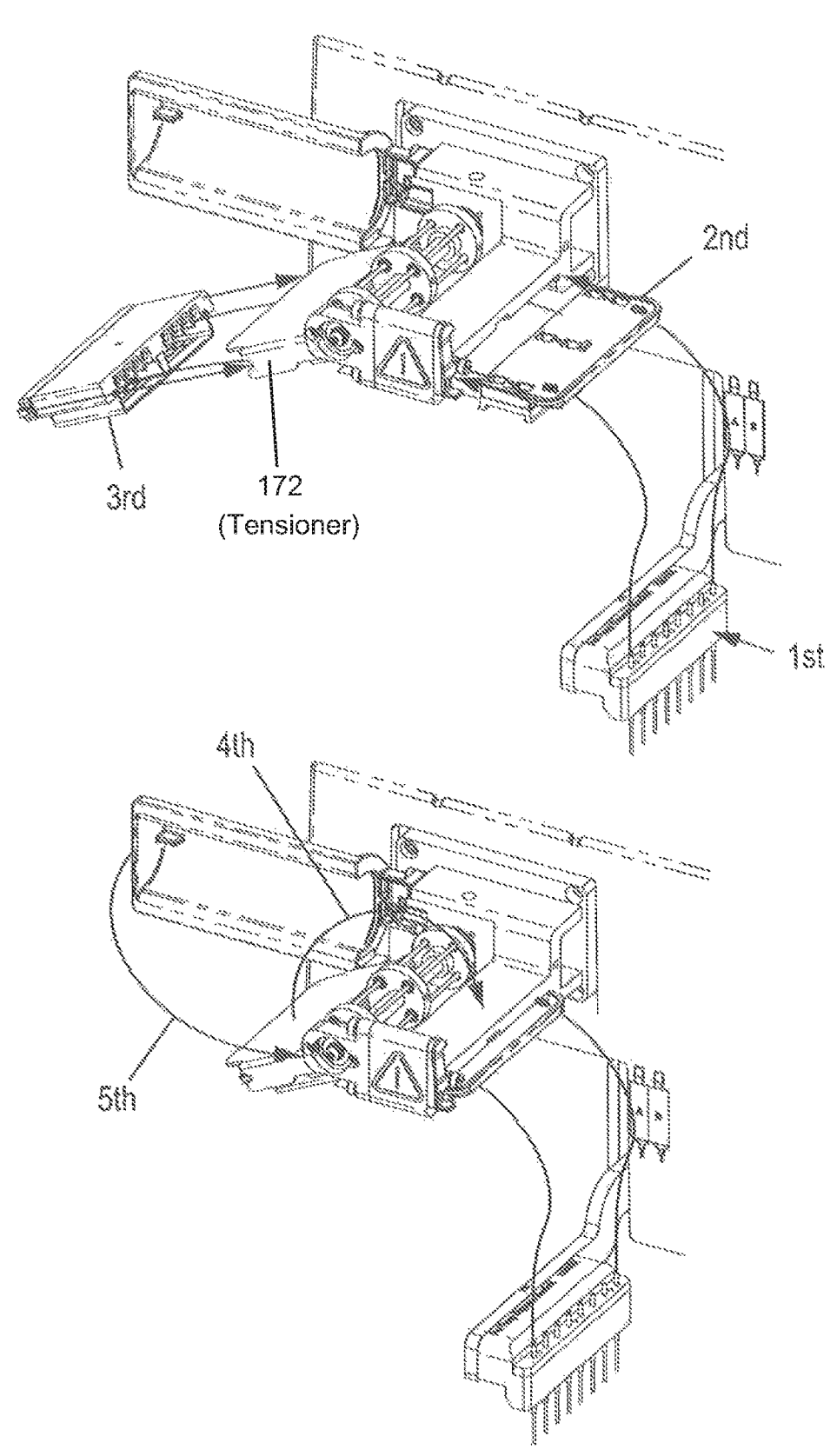
FIG. 17 is a diagram of loading a cassette into an instrument and on a pump, according to an embodiment.

FIG. 17 is a diagram of loading a cassette into an instrument and on a pump, according to an embodiment.

FIG. 17 illustrates a process of placement of the peristaltic pump dispense cassette onto the peristaltic pump.

The procedure may be manually accomplished without tools required for either insertion or removal of the cassette.

In a first step of the dispensing peristaltic pump cassette installation, the dispensing block is placed onto vertically moving arm. In a second step, the first section of tube organizer closest to dispensing block is slipped into bracket of the dispensing peristaltic pump. In a third step, a remaining section of tube organizer is slipped into tensioner 172 of the dispensing peristaltic pump. In a fourth step, the tensioner 172 is manually rotated till locked and thus stretches the cassette tubing over pump rollers. In a fifth step, the safety cover is closed around the rollers to prevent operator's access to rotating pump rollers.

Embodiments of the present application have been described for illustrative purposes, and those skilled in the art will appreciate that various modifications, additions and substitutions are possible without departing from the scope and spirit of the present application as disclosed in the accompanying claims. Therefore, the scope of the present application should be defined by the appended claims and their legal equivalents.

What is claimed is:

1. A method of controlling a microplate cell washing system comprising a microplate carrier configured to support a microplate, the microplate comprising a plurality of microplate wells, a dispensing pump, a dispensing pump cassette comprising a plurality of dispense lines directly connected to the dispensing pump and terminating in dispense pipes connected to the plurality of dispense lines, the dispensing pump configured to control a first flow rate of a solution from a fluid reservoir through the plurality of dispense lines, an aspirating peristaltic pump, and an aspirating peristaltic pump cassette comprising a plurality of aspiration lines directly connected to the aspirating peristaltic pump and terminating in aspiration pipes connected to the plurality of aspiration lines, the aspirating peristaltic pump configured to control a second flow rate of a waste solution through the plurality of aspiration lines, the method comprising:

controlling the dispensing pump to control the first flow rate of the solution from the fluid reservoir through the plurality of dispense lines for output via the dispense pipes in microplate wells corresponding to positions of the dispense pipes; and controlling the aspirating peristaltic pump to control the second flow rate of the waste solution through the plurality of aspiration lines for aspiration via the aspiration pipes in microplate wells corresponding to positions of the aspiration pipes.

2. The method of claim 1, further comprising:

controlling a position of the microplate carrier; and controlling positioning of the plurality of the microplate wells relative to the dispense pipes, and the positioning of the plurality of microplate wells relative to the aspiration pipes, based on the position of the microplate carrier.

3. The method of claim 2, wherein the positioning of the plurality of microplate wells comprises a horizontal positioning of the plurality of microplate wells.

4. The method of claim 3, wherein the positioning of the plurality of microplate wells further comprises a vertical positioning of the plurality of microplate wells.

5. The method of claim 2, wherein controlling the dispensing pump comprises controlling a first motor to control the first flow rate of the solution from the fluid reservoir through the plurality of dispense lines, and wherein controlling the aspirating peristaltic pump comprises controlling a second motor and a second plurality of rollers driven by the second motor to control the second flow rate of the waste solution through the plurality of aspiration lines.

6. The method of claim 1, wherein the solution comprises a cell growth media.

7. The method of claim 1, wherein the dispensing pump is a dispensing peristaltic pump, and the dispensing pump cassette is a dispensing peristaltic pump cassette.

8. The method of claim 7, further comprising:

controlling a position of the microplate carrier; and controlling positioning of the plurality of the microplate wells relative to the dispense pipes, and the positioning of the plurality of microplate wells relative to the aspiration pipes, based on the position of the microplate carrier.

9. The method of claim 8, wherein controlling the dispensing peristaltic pump comprises controlling a first motor and a first plurality of rollers driven by the first motor to control the first flow rate of the solution from the fluid reservoir through the plurality of dispense lines, and wherein controlling the aspirating peristaltic pump comprises controlling a second motor and a second plurality of rollers driven by the second motor to control the second flow rate of the waste solution through the plurality of aspiration lines.

10. The method of claim 1, further comprising:

adjusting a first position of the dispense pipes of the dispensing pump cassette in a vertical direction relative to a top surface of the microplate; and adjusting a second position of the aspiration pipes of the aspirating peristaltic pump cassette in the vertical direction relative to the top surface of the microplate, independently from the adjusting the first position of the dispense pipes.

11. A non-transitory computer-readable medium storing computer instructions that are configured to, when executed by at least one processor, cause the at least one processor to:

control a dispensing pump, of a microplate cell washing system, to control a first flow rate of a solution from a fluid reservoir, of the microplate cell washing system, through a plurality of dispense lines in a dispensing pump cassette, of the microplate cell washing system, for output via dispense pipes, of the microplate cell washing system, in microplate wells corresponding to positions of the dispense pipes; and control an aspirating peristaltic pump, of the microplate cell washing system, to control a second flow rate of waste solution through a plurality of aspiration lines in an aspirating peristaltic pump cassette, of the microplate cell washing system, for aspiration via aspiration pipes, of the microplate cell washing system, in microplate wells corresponding to positions of the aspiration pipes.

12. The non-transitory computer-readable medium of claim 11, wherein the computer instructions are further configured to, when executed by the at least one processor, cause the at least one processor to:

control a position of a microplate carrier that is configured to support a microplate that includes the microplate wells; and control positioning of the microplate wells relative to the dispense pipes, and the positioning of the microplate wells relative to the aspiration pipes, based on the position of the microplate carrier.

13. The non-transitory computer-readable medium of claim 12, wherein the computer instructions are configured to cause the at least one processor to horizontally position the microplate wells.

14. The non-transitory computer-readable medium of claim 13, wherein the computer instructions are configured to cause the at least one processor to vertically position the microplate wells.

15. The non-transitory computer-readable medium of claim 12, wherein the computer instructions are configured to cause the at least one processor to control the dispensing pump by controlling a first motor to control the first flow rate of the solution from the fluid reservoir through the plurality of dispense lines, and wherein the computer instructions are configured to cause the at least one processor to control the aspirating peristaltic pump by controlling a second motor and a second plurality of rollers driven by the second motor to control the second flow rate of the waste solution through the plurality of aspiration lines.

16. The non-transitory computer-readable medium of claim 11, wherein the solution comprises a cell growth media.

17. The non-transitory computer-readable medium of claim 11, wherein the dispensing pump is a dispensing peristaltic pump, and the dispensing pump cassette is a dispensing peristaltic pump cassette.

18. The non-transitory computer-readable medium of claim 17, wherein the computer instructions are further configured to, when executed by the at least one processor, cause the at least one processor to:

control a position of a microplate carrier that is configured to support a microplate that includes the microplate wells; and control positioning of the microplate wells relative to the dispense pipes, and the positioning of the microplate wells relative to the aspiration pipes, based on the position of the microplate carrier.

19. The non-transitory computer-readable medium of claim 18, wherein the computer instructions are configured to cause the at least one processor to control the dispensing peristaltic pump by controlling a first motor and a first plurality of rollers driven by the first motor to control the first flow rate of the solution from the fluid reservoir through the plurality of dispense lines, and wherein the computer instructions are configured to cause the at least one processor to control the aspirating peristaltic pump by controlling a second motor and a second plurality of rollers driven by the second motor to control the second flow rate of the waste solution through the plurality of aspiration lines.

20. The non-transitory computer-readable medium of claim 11, wherein the computer instructions are further configured to, when executed by the at least one processor, cause the at least one processor to:

adjust a first position of the dispense pipes of the dispensing pump cassette in a vertical direction relative to a top surface of a microplate that includes the microplate wells; and adjust a second position of the aspiration pipes of the aspirating peristaltic pump cassette in the vertical direction relative to the top surface of the microplate, independently from the adjusting the first position of the dispense pipes.

* * * * *